United States Patent
Roba et al.

(10) Patent No.: US 7,299,659 B2
(45) Date of Patent: Nov. 27, 2007

(54) METHOD FOR MANUFACTURING OPTICAL FIBER PREFORMS

(75) Inventors: Giacomo Stefano Roba, Monza (IT); Massimo Nutini, Milan (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 643 days.

(21) Appl. No.: 10/451,076

(22) PCT Filed: Nov. 30, 2001

(86) PCT No.: PCT/EP01/14017

§ 371 (c)(1),
(2), (4) Date: Dec. 24, 2003

(87) PCT Pub. No.: WO02/49976

PCT Pub. Date: Jun. 27, 2002

(65) Prior Publication Data

US 2004/0112092 A1    Jun. 17, 2004

Related U.S. Application Data

(60) Provisional application No. 60/256,950, filed on Dec. 21, 2000.

(30) Foreign Application Priority Data

Dec. 19, 2000 (EP) .................................. 00127849

(51) Int. Cl.
*C03B 37/018* (2006.01)
*F23D 11/00* (2006.01)

(52) U.S. Cl. ........................... 65/421; 65/531; 65/17.4

(58) Field of Classification Search ................... 65/414, 65/421, 413, 531, 17.4
See application file for complete search history.

(56) References Cited

U.S. PATENT DOCUMENTS

| | | | |
|---|---|---|---|
| 4,345,928 A | 8/1982 | Kawachi et al. | |
| 4,465,708 A | 8/1984 | Fanucci et al. | |
| 4,474,593 A | 10/1984 | Andrejco et al. | |
| 4,661,140 A | 4/1987 | Takimoto et al. | |
| 4,801,322 A | 1/1989 | Suda et al. | |
| 4,810,189 A | 3/1989 | Mikami et al. | |
| 4,826,520 A | 5/1989 | Kawazoe et al. | |
| 4,915,716 A * | 4/1990 | Monroe et al. | 65/416 |
| 4,915,717 A * | 4/1990 | Watanabe et al. | 65/415 |

(Continued)

OTHER PUBLICATIONS

Y. Hiroshi, "Production of Soot Body of Pulverized Glass Particle and its Burner", Patent Abstracts of Japan, JP 59039735, Mar. 3, 1984.

(Continued)

*Primary Examiner*—Carlos Lopez
(74) *Attorney, Agent, or Firm*—Finnegan, Henderson, Farabow, Garrett & Dunner, L.L.P.

(57) ABSTRACT

Method and burner for increasing the deposition rate of porous glass deposit in the manufacture of optical preforms, by modifying the cross-sectional shape of the flow of glass particles impacting onto a target preform. In particular, the cross-section of the flow of glass particles is modified by increasing the dimension of the flow from a circular cross-section to one having a major and minor axis in a direction substantially perpendicular to the longitudinal axis of the target preform.

10 Claims, 5 Drawing Sheets

U.S. PATENT DOCUMENTS 5,238,479 A * 8/1993 Ohga et al. .................. 65/414
6,725,690 B2 * 4/2004 Enomoto et al. ............. 65/414

OTHER PUBLICATIONS

M. Masao, "Production of Dispersion Shift Fiber Preform"; Patent Abstracts of Japan, JP 06199534, Jul. 19, 1994.

T. Masahiro, "Production of Fine Glass Particle-Deposited Body"; Patent Abstracts of Japan, JP 02164733, Jun. 25, 1990.

Y. Hiroshi, "Production of Glass Article"; Patent Abstracts of Japan, JP 04228440, Aug. 18, 1992.

T. Kanze, "Manufacturing of Optical Fiber Capable of Conserving Plane of Polarization"; Patent Abstracts of Japan, JP 580496632, Mar. 23, 1983.

E. Takao, "Production of Optical Fiber Base Material", Patent Abstracts of Japan, JP 55080733, Jun. 18, 1980.

* cited by examiner

METHOD FOR MANUFACTURING OPTICAL FIBER PREFORMS

CROSS REFERENCE TO RELATED APPLICATIONS

This application is a national phase application based on PCT/EP01/14017, filed Nov. 30, 2001, the content of which is incorporated herein by reference, and claims the priority of European Patent Application No. 00127849.8 filed Dec. 19, 2000, and claims the benefit of U.S. Provisional Application No. 60/256,950, filed Dec. 21, 2000.

BACKGROUND OF THE INVENTION

1. Field of the Invention

The present invention relates to a method for manufacturing an optical fiber preform used to make optical glass fibers. In particular it relates to a method for increasing the deposition rate of a process by suitably redistributing a flow of glass particles before it impacts onto a target preform.

2. Background Art

Glass fibers for optical communication are made from high purity, silica-based glass fibers drawn from glass preforms, which preforms are produced according to various glass deposition techniques.

Some of these deposition techniques, including vapor axial deposition (VAD) and outside vapor deposition (OVD), are based on flame combustion wherein reactants (i.e. silica precursors, such as $SiCl_4$, optionally together with dopants materials, such as $GeCl_4$, for suitably modifying the refractive index of the glass) are fed together with combusting gases through a deposition burner which directs a high temperature flow of forming fine glass particles onto a rotating growing target preform.

According to the VAD deposition technique, the growth of the preform takes place in an axial direction. Thus, the deposition burner(s) is typically maintained in a substantially fixed position, while the rotating preform is slowly moved upwardly (or downwardly) with respect to the burner, in order to cause the axial growth of the preform. Alternatively, the rotating preform can be maintained in a substantially fixed position, while the deposition burner is slowly moved downwardly (or upwardly) with respect to the preform.

Differently from the VAD technique, in the OVD technique the growth of the preform takes place in a radial direction. In this case, a rotating target (e.g. a quartz glass rod) is generally positioned in a fixed horizontal or vertical position and the deposition burner is repeatedly passed along the surface of the growing preform for causing the radial growth of the same.

Independently from the applied deposition technique, a porous glass preform is thus fabricated, which is then consolidated to form a solid glass preform apt for being subsequently drawn into an optical fiber.

Typically, an optical preform comprises a central portion (core) and an outer portion (cladding), the core and the cladding differing in their respective chemical composition and having thus different refractive indexes. As in the optical fibers, the cladding portion forms the majority of the preform. The preform is typically manufactured by producing and consolidating a first preform comprising the core and a first portion of the cladding. An overcladding layer is then deposited onto said first preform, thus obtaining a porous preform, which is then consolidated into the final preform.

In general, conventional burners for manufacturing optical preforms are made up of a plurality of co-axial pipes through which the glass precursor materials (i.e. silica precursors, such as $SiCl_4$, optionally together with dopants materials, such as $GeCl_4$), the combusting gases (e.g. oxygen and hydrogen or methane) and, optionally, some inert gas (e.g. argon or helium) are fed. Typically, the glass precursor material is fed through the central pipe of the burner, while other gases are fed through the annular openings formed by the concentrically disposed pipes.

Examples of such conventional burners are disclosed, for instance, in U.S. Pat. Nos. 4,345,928, 4,465,708, 4,474,593, 4,661,140, and 4,810,189.

"Multi-flame" burners, generating a plurality of independent flames disposed concentrically one to each other, are also disclosed. For instance, U.S. Pat. No. 4,801,322 discloses a multi-flame burner wherein the inner flame, including a glass precursor material, is positioned rearwardly of the outer flame. As mentioned in said patent, the outer flame allows to increase the flame length with consequent size increase of the synthesised glass particles.

U.S. Pat. No. 4,826,520 discloses a modified multi-flame burner for producing doped optical preforms wherein a central pipe, through which a doping reactant ($GeCl_4$) is fed, is spaced forwardly with respect to the other pipes forming the inner flame, in order to reduce the staying time of the doping material inside the flame.

With the increasing demand for optical fibers, there is now the need of manufacturing optical preforms of larger dimensions and in a more effective and fast manner.

As observed by the Applicant, while the burners for depositing the core and the inner cladding of the preform are generally of reduced dimensions, burners used for depositing the overcladding, in particular for large dimensions preforms, shall be relatively larger, in order to allow the generation of the higher flow rates necessary for increasing the amount of deposited material, maintaining at the same time the velocity of the gases relatively low.

The Applicant has now observed that, particularly for cladding or overcladding deposition (in the specific according to the VAD deposition technique) and especially when manufacturing large optical preforms, the deposition rate of the process can be increased by suitably redistributing the flow of fine glass particles impacting onto the target preform. This can be done by suitably modifying the geometry of the deposition burner. In particular, it has been observed that the shape of said flow can be advantageously modified in its terminal portion before impacting onto the target preform, by increasing the dimension of said flow in a direction substantially perpendicular to the longitudinal axis of said target preform.

SUMMARY OF THE INVENTION

An aspect of the present invention thus relates to a method for increasing the deposition rate of a process for manufacturing an optical preform, which comprises the steps of:
generating a flow of forming glass particles;
directing said flow of particles towards a growing preform and causing said flow of particles to impact onto said preform;

wherein said method further comprises the steps of:
conferring to said flow of gas particles a cross-sectional shape having a major axis and a minor axis;
causing said flow of particles to be directed towards said growing preform with the major axis of the cross-sectional shape having a direction substantially orthogonal to the longitudinal axis of said preform.

In particular, an aspect of the present invention relates to a method for producing an optical preform which comprises:
feeding a flow of glass precursor material into a deposition burner and conferring to said flow a substantially circular cross-section;
feeding a flow of combustible gas and a flow of combustion sustaining gas into said burner, in order to create a flame for uniformly heating said flow of glass precursor material and causing said glass precursor material to react, thereby forming a flow of fine glass particles;
directing said flow of fine glass particles and said flame towards a target preform having an initial diameter;
causing said flow of glass particles to impact onto said target preform, thus increasing the radial dimensions of said preform up to a final diameter;
wherein the cross-section of at least the terminal portion of said flow impacting onto the target preform is modified into a cross-sectional shape having a major axis and a minor axis, said major axis being substantially orthogonal to the longitudinal axis of the target preform.

Preferably, said flame has a substantially circular cross-section which uniformly encircles the flow of glass precursor material in correspondence with its respective circular cross-section portion.

Preferably, said method further comprises conferring also to the terminal portion of said flame a cross-sectional shape having a major axis and a minor axis, said major axis being substantially orthogonal to the longitudinal axis of the target preform, in order to uniformly surround the terminal portion of the flow of glass particles. According to a preferred embodiment, said major axis of the cross-section of the terminal portion of the flame surrounding the flow of glass particles is at least 1.2 times longer than the minor axis.

Preferably, the length of said major axis less than about 2.5 times the length of the minor axis. More preferably, said major and minor axis are in ratio of from about 1.25:1 to about 1.8:1.

Preferably, said major axis is in a ratio of at least about 1:2 or higher with respect to the initial diameter of the growing preform, more preferably of at least about 1:2.5 or higher.

The ratio between said major axis and the final diameter of the preform is preferably lower than about 1:7, preferably lower than about 1:6. Another aspect of the present invention relates to a deposition burner for manufacturing an optical preform, which comprises:
a plurality of ducts through which at least a flow of a glass precursor material, of a combustible gas and of a combustion sustaining gas are passed, said flows of combustible gas and of combustion sustaining gas for generating a flame which surrounds said flow of glass precursor material;
wherein an elongated hollow element is disposed to surround and confine said flame and said flow of glass precursor material, said elongated hollow element:
having an initial portion adjacent to said plurality of ducts and an a terminal portion opposed to said initial portion;
being formed into a substantially circular cross-section in at least said initial portion; and
being formed into a cross-section having a major and a minor axis in its terminal portion.

Preferably, said elongated hollow element is formed into a substantially circular cross-section for the majority of its length.

Preferably, said elongated hollow element is formed into a substantially elliptical cross-section in its terminal portion.

Preferably said plurality of ducts is disposed co-axially one to each other. Advantageously, the flow of glass precursor material is passed through the innermost of said ducts.

According to a preferred embodiment, the above burner is a multi-flame burner which comprises:
at least an inner section for generating an inner flame, said inner section comprising a first plurality of ducts through which at least a glass precursor material, a combustible gas and a combustion sustaining gas are flown; and
at least an outer section comprising a second plurality of outlets for generating an outer flame surrounding said inner flame, said outer section comprising a second plurality of ducts through which at least a combustible gas and a combustion sustaining gas can be flown;
wherein said elongated hollow element is disposed between the inner and the outer section of said burner to surround and confine said inner flame.

DESCRIPTION OF PREFERRED EMBODIMENTS

According to the present invention, the Applicant has observed that, in a deposition process for manufacturing an optical preform, by suitably redistributing the flow of forming glass particles before said flow impacts onto the target preform, it is possible to increase the deposition rate of a deposition burner.

As a matter of fact, the Applicant has observed that while an optimal and homogeneous heating of the reacting glass precursor material is preferably obtained by conferring to the stream of glass precursor material and to the surrounding flame a substantially circular geometry, the deposition rate of the process can be increased by increasing the dimensions of the flow of glass particles in a direction substantially perpendicular with respect to the longitudinal axis of the target preform.

For the purposes of the present invention, the wording "direction substantially perpendicular with respect to the longitudinal axis of the target preform" is intended to refer to the direction defined by an axis laying on one of the infinite planes that are substantially perpendicular to the longitudinal axis of the preform.

Figure 1:
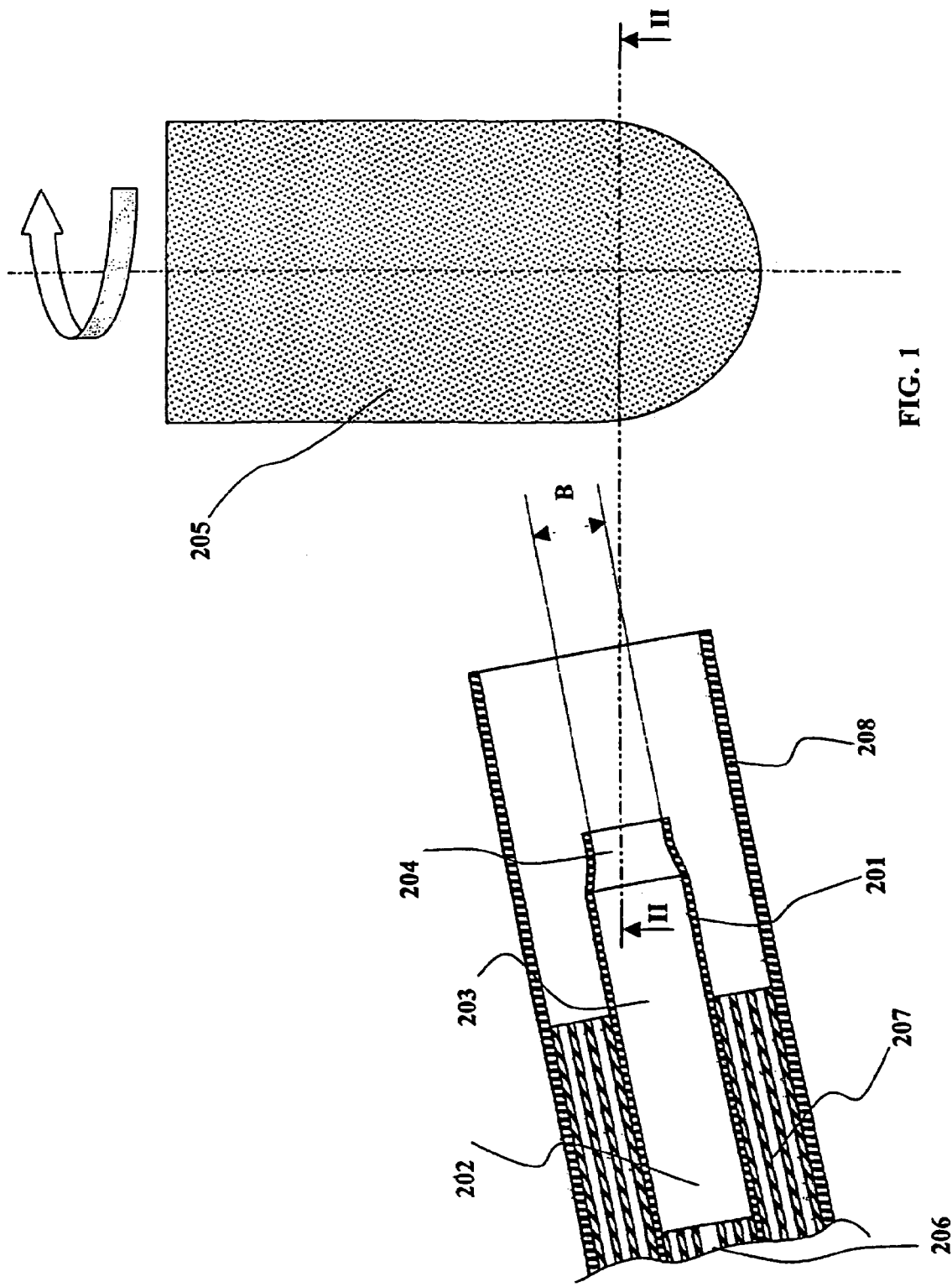
FIG. 1 shows a longitudinal cross-sectional view of a preferred embodiment of a burner according to the present invention.

FIG. 1 show a schematic longitudinal cross-sectional view of a burner for embodying the present invention, comprising glass quartz tube 201 suitably modified in its terminal portion 204, and the relative target preform 205 (not in scale).

Figure 2:
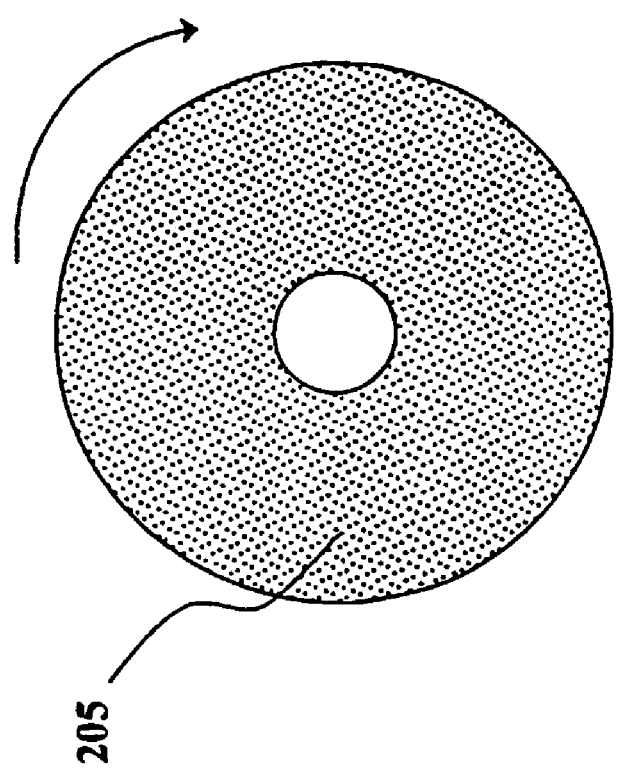
FIG. 2 is a section according to line II-II of FIG. 1.
Figure 2:
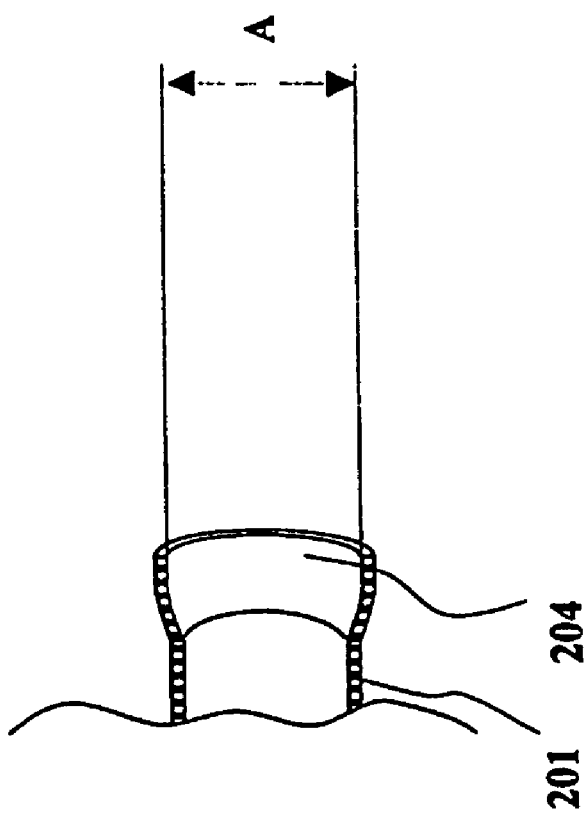

FIG. 2 is a section according to plane II-II of FIG. 1, showing the longitudinal cross-section of the terminal portion 204 of the modified quartz glass tube 201 and of the relative target preform.

This burner comprises an inner section 206, formed by a plurality of co-axial pipes, through which the glass precursor material and the gases for generating the inner flame are passed. The flow of glass precursor material is typically passed through the central pipe and is thus encircled by the inner flame. The burner further comprises an outer section 207, also formed by a plurality of co-axial pipes, through which the gases forming the outer flame are passed, said outer flame thus surrounding the inner flame. A confining quartz glass tube 208 can be disposed to surround the outer section of the burner.

A quartz glass tube 201 is disposed between said inner and said outer section of the burner, in order to confine the inner flame and to separate it from the outer flame. Said quartz glass tube has preferably a substantially circular cross-section in its initial portion 202, i.e. in contact with the co-axial pipes, and preferably also in its middle portion 203, for causing an optimal and homogeneous heating of the reacting glass precursor material. For embodying the method of the present invention, said quartz glass tube 201 is thus suitably modified in correspondence with its terminal portion 204, in order to confer a substantially elliptical cross section to the flow of glass particles and to the surrounding flame exiting from said tube and impacting onto the target preform. As illustrated In FIGS. 1 and 2, said elliptical cross section has thus a major axis "A" and a minor axis "B". Other suitable forms having a major and minor axis (e.g. rectangular) can be applied to the outlet of the glass tube.

Preferably, the modification of the cross-section of the glass tube is effected at about 4/5, more preferably at about 9/10 of the length of the glass tube, in order to allow a sufficient length for homogeneously heating and reacting the flow of glass precursor material and allowing the homogeneous growth of glass particles.

It will be understood by those skilled in the art that both the terms "major axis" and "minor axis" are intended to refer either to the inner cross-section of a quartz glass tube as above illustrated or to the cross-section of a flame surrounding the flow of glass particles (which may be generated by such a modified glass tube).

As observed by the Applicant the redistribution of the stream of growing silica particles (in particular from a circular into an elliptical cross-section) and its suitable orientation with respect to the longitudinal axis of the preform results in an increase of the deposition rate of the burner. In particular, the Applicant has observed that the deposition rate of the burner can be increased by disposing said confining quartz glass tube such that the major axis "A" of said glass tube is substantially perpendicular with respect to the longitudinal axis of the target preform, as shown schematically in FIGS. 1 and 2. In particular, said major axis "A" lays on plane which is substantially perpendicular to the longitudinal axis of the preform.

Preferably, the cross-section of the modified opening of the quartz glass tube shall have a surface substantially equivalent to the one of circular cross section of the lower end portion of the tube, in order to avoid undesirable changes in the velocity of the gas flowing through said the tube.

In order to effectively increase the deposition rate of the burner, the ratio between the above defined major axis and minor axis shall preferably be of at least about 1.2 or higher. On the other side, in order to avoid an excessive modification of the geometry of the flow of glass particles (which may cause undesired turbulences in the flows of the burner) said ratio is preferably kept lower than about 2.5. Preferably, said ratio is from about 1.25 to about 1.8.

In addition, the Applicant has observed that said major axis should be relatively smaller with respect to the initial diameter of the growing preform, in order to avoid excessive dispersion of silica particles. Preferably, said major axis is thus in a ratio of at least about 1:2 or higher with respect to the initial diameter of the growing preform, more preferably of at least about 1:2.5 or higher. On the other side, said major axis should be sufficiently large with respect to the final diameter of the preform, in order to effectively increase the deposition rate of the process.

In particular, the ratio between said major axis and the final diameter of the preform is preferably lower than about 1:7, preferably lower than about 1:6.

Figure 5:
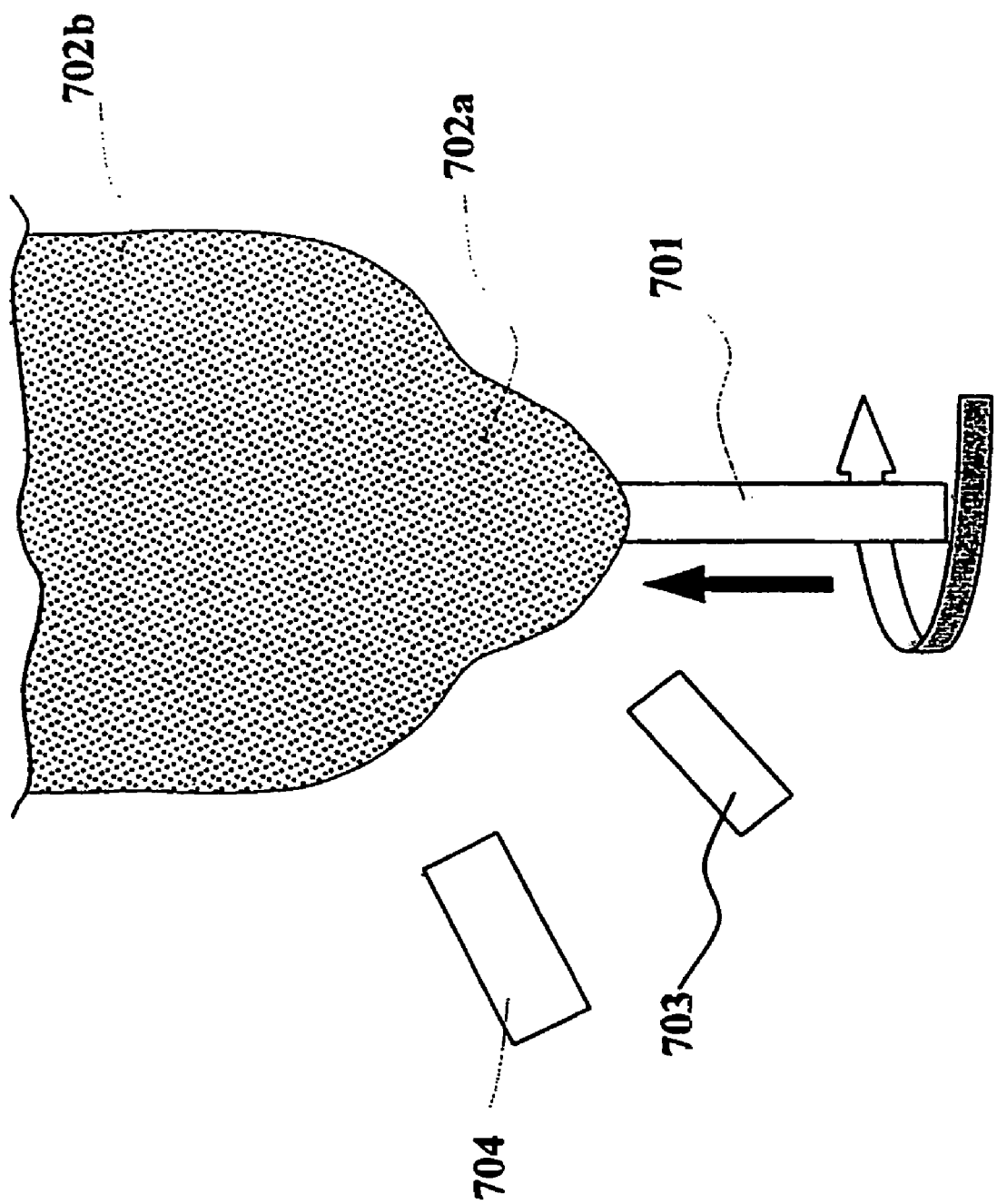
FIG. 5 schematically shows an overcladding deposition process according to the present invention.

For instance, in a double burner overcladding deposition process as illustrated in FIG. 5, where the upper burner 704 starts the deposition on a growing preform of about 90-100 mm diameter and increases the diameter of said preform up to about 180-200 mm, the cross-sectional dimensions of the separating quartz tube may be the following:

Circular section: diameter about 31 mm

Elliptical section: major axis about 34 mm; minor axis about 24.5 mm.

Advantageously, the method of the present invention is particularly suitable for being used in the over-cladding deposition of large diameter preforms, where the flow rate of the glass precursor material is typically kept higher than about 8 slm (standard liter per minute), in particular at about 10 slm or higher.

FIG. 5 schematically illustrates a typical overcladding deposition process for embodying the method of the present invention. The deposition typically starts onto a glass rod 701 of about 20 mm diameter, comprising the core of the preform and a first portion of the cladding layer, separately manufactured according to conventional techniques. The target preform is rotated about is longitudinal axis and slowly upwardly translated. A lower overcladding burner 703 deposits a first portion of overcladding layer 702a, e.g. up to a diameter of about 90-100 mm onto the preform. An upper burner 704 then completes the deposition by depositing a second overcladding layer 702b, e.g. increasing the diameter of the deposited soot at about 180-200 mm. Typically, the upper burner 704 has increased dimensions with respect to the lower one, in order to allow the deposition of higher amount of silica particles in the time unit. These dimensions correspond substantially to the dimensions mentioned in connection with the burner illustrated in FIGS. 3-4.

The so obtained porous preform is then heated into a furnace and collapsed to obtain a final preform of about 60-80 mm diameter, which is then drawn into an optical fiber according to conventional techniques.

While a burner according to the present invention can advantageously be used in the above process for depositing the overcladding layer of the preform, in particular the outer overcladding portion (i.e. as burner 704), it will be appreciated that such a burner, when suitably dimensioned, can also be used for the deposition of the core and of the inner portion of the cladding.

Figure 3:
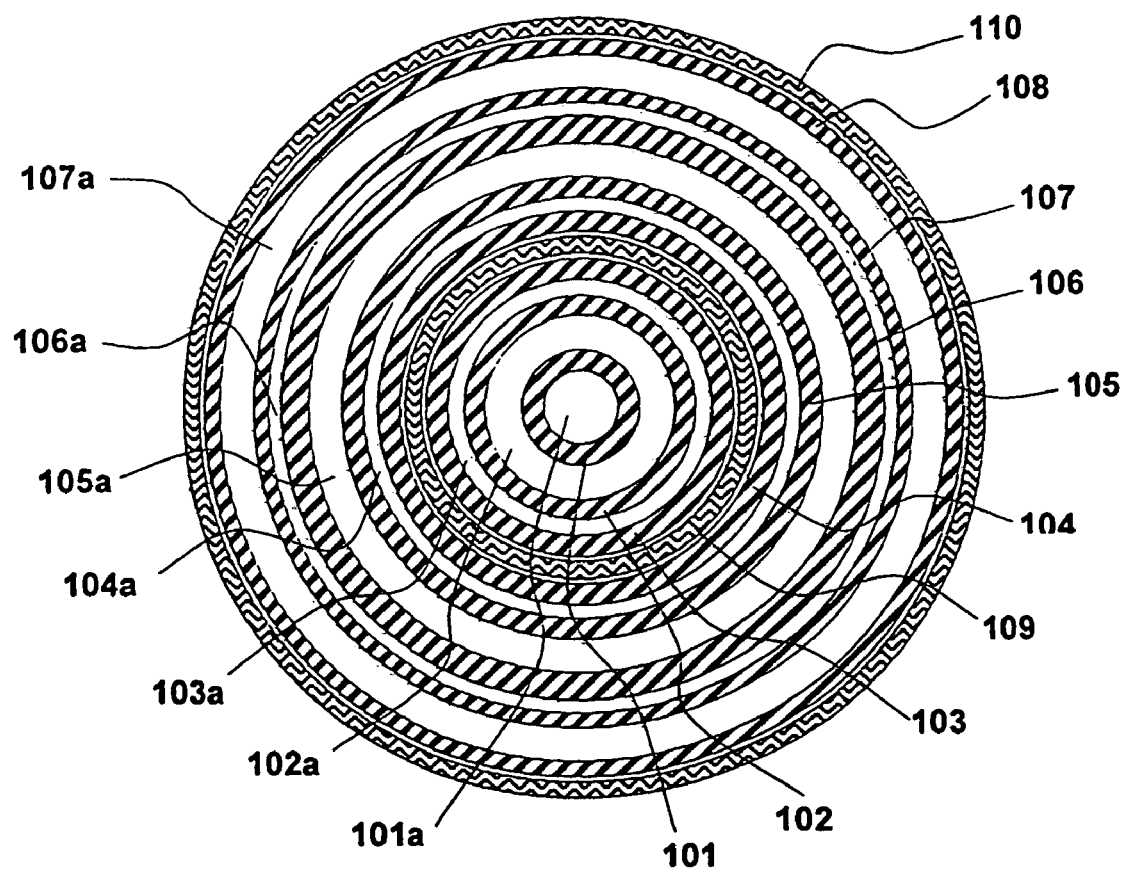
FIG. 3 shows a schematic transversal cross-sectional view of a deposition burner for embodying the method of the present invention.

FIG. 3 shows a schematic transversal cross-sectional view of an example of a burner suitable for embodying the deposition method of the invention. In the specific, this embodiment illustrates a double-flame burner, particularly suitable for overcladding deposition.

The burner of FIG. 3 comprises seven openings 101a-107a through which the gases for forming the preform are passed.

Openings 101a-103a define the inner section of the burner, while openings 104a-107a define the outer section. The central opening 101a is delimited by the walls of a pipe 101, while the other annular openings are delimited by the respective outer and inner walls of pipes 101 to 108. The length of the pipes defining the inner and the outer section of the burner can be substantially the same, or the pipes defining the openings of the outer section can preferably be longer than the pipes defining the openings of the inner section, as shown in FIGS. 1 and 2.

The pipes are preferably made from a metallic material, in particular from an easily machinable and heat/corrosion resistant stainless steel. An example of a suitable metal material is AISI (American Institute Steel and Iron) 316L, which is a stainless steel comprising about 0.03% C about 16-18% of Cr, about 11.5%-14.5% of Ni, about 2% of Mn and about 2.5%-3% of Mo.

Typically, the inner pipe 101 has an inner diameter of from about 6 mm to about 8 mm and a thickness of from about 0.5 mm to about 2 mm.

The other pipes, having preferably a thickness comprised from about 0.5 mm to about 2.5 mm, are then arranged coaxially one to each other to form openings 102a-107a having widths of from about 1 mm to about 3.5 mm, depending on the relative diameter of the pipe and flow rate of gas through the aperture.

In particular, the width of each opening is selected according to the amount and kind of gas which is flown through said opening and to the relative radial position of said opening. For instance, in a burner particularly designed for the outer cladding deposition, openings through which inert gas is flown are dimensioned so to obtain an exit velocity of the gas of from about 0.1 and about 2 m/s. Said annular openings may thus have a width of from about 1 mm to about 1.5 mm. On the other side, openings through which combustion gases are flown are dimensioned so to obtain an exit velocity of the gas of from about 2 and about 10 m/s. Said annular openings may thus have a width of from about 2 mm to about 3.5 mm.

A separating tube 109 made from a heat resistant material, is disposed into the annular housing between pipes 103 and 104, said tube extending for a certain length farther from the tips of the pipes of the inner portion of the burner, as shown in FIGS. 1 and 2. Said tube is suitably modified in its upper terminal portion similarly to the tube 501 illustrated in FIGS. 1 and 2.

Tube 109 thus allows both to physically separate the inner flame from the metal components of the outer section of the burner and to confine the inner flame in its lower and middle portion, while redistributing the flow of glass particles in its modified upper terminal portion.

A second tube 110, also made from heat resistant material, can be disposed externally to the metal pipe 108, extending for a certain length farther from the tips of the pipes of the outer portion of the burner for confining the outer flame, similarly to tube 508 of FIGS. 1 and 2.

The heat resistant material of tubes 109 and 110 is made for instance from quartz glass or alumina, preferably quartz, in particular high purity quartz.

Preferably, the separating tube 109 extends for a length such to entirely surround the reaction zone where glass raw material hydrolysis occurs.

Thus, particularly for overcladding burners having dimensions and flow rates as previously mentioned, the Applicant has determined that the separating tube 109 should preferably extend for at least about 80 mm from the tips of the pipes of the inner section of the burner. The length of the tube should however preferably not exceed about 150 mm. Preferably, said length is from about 90 to about 130 mm.

Preferably, the outer tube 110 extends for about 150 mm to about 220 mm from the tips of the pipes of the outer section.

Advantageously, the metallic coaxial pipes are first assembled together to form the burner, leaving a suitable annular clearance between two neighbouring pipes, said clearance being apt to receive the separating quartz tube 109. The separating tube 109 can thus be inserted into and (if necessary) removed from said annular clearance with a rather simple operation. Similarly, the outer glass tube 110 can be fitted on (and removed from) the outer surface of the outer metal pipe (suitably adapted for receiving said glass tube), after the metal pipes of the burner have been assembled together.

Typically the glass precursor material is flown through the central duct of the burner, defined by opening 101a. Said glass precursor material is preferably admixed with a high thermal diffusivity gas, in order to increase the heat transfer from the inner flame towards the flow of glass precursor material.

The high thermal diffusivity gas is preferably admixed in a volume fraction of from about 0.05 to about 0.5 parts with respect to the total volume of the mixture, preferably of from about 0.1 to about 0.4 parts, depending also from the thermal diffusivity of the glass precursor material (e.g. $2.84 \cdot 10^{-6}$ $m^2/s$ at 400° K for $SiCl_4$). Suitable high thermal diffusivity gases are those gases having a thermal diffusivity of at least $3.0 \cdot 10^{-5}$ $m^2/s$ or higher, e.g. up to about $2.0 \cdot 10^{-4}$ $m^2/s$ (values at 400° K). Examples of suitable high thermal diffusivity gases are oxygen, nitrogen, argon, helium and hydrogen. Preferably oxygen is used A combustible gas and a combustion sustaining gas are then flown through the annular ducts of the burner defined by openings 102a-107a, optionally together with an inert gas. Examples of suitable combustible gas are hydrogen or hydrocarbons, such as methane. Oxygen is typically used as the combustion sustaining gas.

If desired, an inert gas may be flown through the annular ducts, either alone or admixed with the above combustible gas or combustion sustaining gas. For instance, an inert gas may be flown through an annular duct disposed between a first annular duct dedicated to the inlet of a combustible gas and a second annular duct dedicated to the inlet of a combustion sustaining gas. This allows a physical separation of the two flows of combustible gas and of combustion sustaining gas, thus displacing the flame away from the tips of the metal pipes and avoiding possible overheating of the same. Similarly, the flame can be displaced away from the tips of the metal pipes by suitably increasing the inlet speed of the combustible gas and of combustion sustaining gas. Examples of suitable inert gases are argon, helium, nitrogen.

With specific reference to the burner design of FIG. 3, the glass precursor material, e.g. silicon tetrachloride, preferably admixed with a high thermal diffusivity gas (e.g. oxygen), is thus flown through the central opening 101a, hydrogen through annular opening 102a and oxygen through annular opening 103a of the inner section of the burner. The flows of hydrogen and oxygen through the annular openings are maintained at a sufficiently high rate in order to form the flame at a sufficient distance from the tips of the metal pipes. Oxygen is preferably kept in a relatively high stoichometric excess with respect to hydrogen, the $O_2/H_2$ molar ratio being preferably of from about 1.8:1 to about 3:1.

Said excess of oxygen allows to obtain a convergent flame and to create an oxygen boundary layer on the inner surface of the quartz tube 109, for reducing the heat transferred onto the quartz tube. For determining the excess of oxygen in the inner flame, also the possible reaction of said oxygen with the hydrogen flowing from the outer section of the burner shall be taken into account. In order to effectively create said boundary layer, the Applicant has observed that the inlet speed of the oxygen gas into a burner as above defined should preferably be of at least 3.0 m/s or higher, e.g. up to about 10.0 m/s.

In the outer section of the burner, argon is flown through opening 104a, hydrogen through opening 105a, argon through opening 106a and oxygen through opening 107a. In this case, oxygen is flown in a stoichometric ratio or preferably in slight excess with respect to hydrogen, the $O_2/H_2$ molar ratio being from about 1:2 to about 1:1 preferably from about 1:1.95 to about 1:1.75.

As previously mentioned, the hydrogen flowing from the outer section may also partially react with the excess of oxygen flowing from the inner section of the burner.

Figure 4:
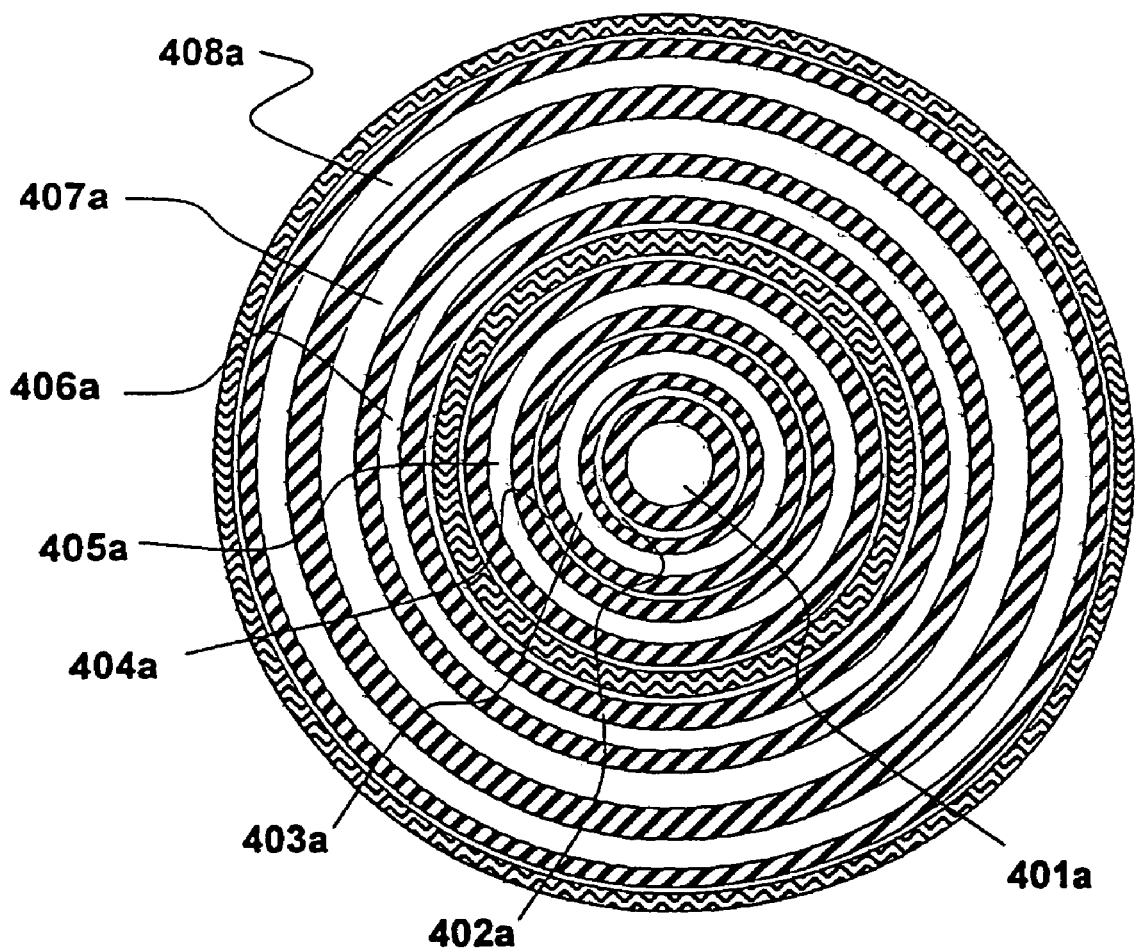
FIG. 4 shows a schematic cross-sectional transversal view of an alternative burner for embodying the method of the present invention.

According to an alternative configuration shown in FIG. 4, the glass precursor material, e.g. silicon tetrachloride, admixed with a high thermal diffusivity gas, preferably oxygen, is flown through the central opening 401a, argon through opening 402a, hydrogen through opening 403a, argon through opening 404a and oxygen through opening 405a of the inner section of the burner. In this case, the interposition of an argon's flow between oxygen's and hydrogen's flows allows the flame to be displaced away from the tips of the metal pipes. As for the burner illustrated in FIG. 3, a quartz glass tube 109 separates the inner section of the burner from the outer one. Similarly to the burner illustrated in FIGS. 1 and 2, said tube 109 is modified in its upper terminal portion for suitably redistributing the flow of glass particles.

As previously mentioned, oxygen flowing through opening 405a is preferably kept in a relatively high stoichometric excess with respect hydrogen. In the outer section of the burner, argon is flown through opening 406a, a mixture of hydrogen and argon is flown through opening 407a, and oxygen through opening 408a. Pre-mixing argon with hydrogen can be useful for directing the flow of combustion products toward the target soot and also for lifting the flame from burner orifices.

Similarly to the burner illustrated in FIG. 3, the length of the pipes defining the inner and the outer section of the burner can be substantially the same, or the pipes defining the openings of the outer section can preferably be longer than the pipes defining the openings of the inner section, as shown in FIGS. 1 and 2.

EXAMPLE

For this experiment a burner having a configuration according to FIG. 4 has been used. Pipes 401-409 and ducts 401a-408a of FIG. 4 will be referred to in the present example as pipes 1-9 and ducts 1a-8a, respectively.

Dimensions of ducts (internal diameter, ID, and outer diameter, OD) created by pipes 1-9 and the relative flow of materials is reported in tables 1 and 2, respectively.

TABLE 1

Dimensions of the burner

| Duct No | 1a | 2a | 3a | 4a | 5a | 6a | 7a | 8a |
|---|---|---|---|---|---|---|---|---|
| ID (mm) | — | 8 | 10 | 18 | 20 | 32.4 | 39 | 50 |
| OD (mm) | 7 | 9 | 17 | 19 | 27 | 37 | 48 | 55 |

TABLE 2

Flow of reactants

| Duct No | 1a | 2a | 3a | 4a | 5a | 6a | 7a | 8a |
|---|---|---|---|---|---|---|---|---|
| Reactant | $SiCl_4 + O_2$ | Ar | $H_2$ | Ar | $O_2$ | Ar | $H_2$ + Ar | $O_2$ |
| Flow Rate (slm) | 11 + 3 | 0.8 | 22 | 1.6 | 50 | 10 | 118 + 21 | 60 |

An internal separating quartz glass tube 109, having a thickness of about 1.5 mm and an inner diameter of about 30 mm, has been inserted into the annular clearance between pipes 5 and 6. For the first test, the cross-section of the terminal portion of said tube was not modified (i.e. was circular).

An outer quartz glass tube having a thickness of about 2 mm has been further disposed around tube the outer metal pipe 9.

In this experiment, the tips of pipes 6 to 9, forming the outer section of the burner, were spaced forwardly of about 53 mm from the tips of the pipes 1 to 5, forming the inner section of the burner.

The inner quartz separating tube was prolonged for about 70 mm from the tips of the pipes of the outer section, having thus a total length of about 123 mm from the tips of the pipes of the inner section.

The target preform was a rotating quartz tube of about 90 mm diameter and the burner has been kept at a distance of about 90 mm from the preform, with an inclination of about 12° with respect to the longitudinal axis of the preform.

The preform was translated upwardly at a speed of 168 mm/hr and rotated at about 60 r.p.m.

The deposition was stopped when the preform reached a diameter of about 140-150 mm.

The above burner has then been modified by conferring an elliptical cross-section to the terminal portion of the separating quartz tube, as shown in FIGS. 1 and 2. The section has been changed from circular into elliptical at about 10 mm from the end of the tube, by maintaining substantially unaltered the fluid passage area of the tube. The major axis of the internal elliptical cross-section at the outlet of the tube was of about 34 mm, while the minor axis was of about 24.6 mm.

Said burner has thus been positioned similarly to the previous test (i.e. same distance from and inclination with respect to the preform), with the major axis of the elliptical cross-section of the quartz tube positioned in a direction substantially perpendicular to the longitudinal axis of said preform, i.e. laying on a plane substantially perpendicular to the longitudinal axis of the target preform. The process conditions were as previously described.

A normalized deposition rate (with respect to the value obtained with the circular cross-section burner) of about 1.08 was obtained.

As a comparative experiment, the above burner has been rotated of 90° with respect to its own longitudinal axis, so to exchange the relative positions of the major and of the minor axis. In this case, a deposition rate of about As shown by the above results, by applying the method of the present invention for suitably redistributing the flow of glass particles before impacting onto the target preform, it is thus possible to increase the deposition rate of the deposition process.

The invention claimed is:

1. A method for producing an optical preform which comprises:
   (a) feeding a flow of glass precursor material into a deposition burner and conferring to said flow a substantially circular cross-section;
   (b) feeding a flow of combustible gas and a flow of combustion sustaining gas into said burner, in order to create a flame for uniformly heating said flow of glass precursor material and causing said glass precursor material to react, thereby forming a flow of fine glass particles;
   (c) directing said flow of fine glass particles and said flame toward a target preform having an initial diameter; and
   (d) causing said flow of glass particles to impact onto said target preform, thus increasing the radial dimensions of said preform up to a final diameter;
   wherein the cross-section of at least the terminal portion of said flow impacting onto the target preform is modified into a cross-sectional shape having a major axis and a minor axis, said major axis being substantially orthogonal to the longitudinal axis of the target preform.

2. The method according to claim 1, wherein said flame has a substantially circular cross-section which uniformly encircles the flow of glass precursor material in correspondence with its respective circular cross-section portion.

3. The method according to claim 1, which further comprises conferring also to a portion of said flame a cross-sectional shape having a major axis and a minor axis, said major axis being substantially orthogonal to the longitudinal axis of the target preform, in order to uniformly surround the corresponding modified portion of the flow of glass particles.

4. The method according to claim 3, wherein said major axis of the cross-section of said portion of flame surrounding the modified portion of the flow of glass particles is at least 1.2 times longer than the minor axis of the cross-section of said portion of flame surrounding the modified portion of the flow of glass particles.

5. The method according to claim 3, wherein the length of said major axis of the cross-section of said portion of flame surrounding the modified portion of the flow of glass particles is less than about 2.5 times the length of the minor axis of the cross-section of said portion of flame surrounding the modified portion of the flow of glass particles.

6. The method according to claim 3, wherein said major and said minor axis of the cross-section of said portion of flame surrounding the modified portion of the flow of glass particles are in ratio of from about 1.25:1 to about 1.8:1.

7. The method according to claim 3, wherein said major axis of the cross-section of said portion of flame surrounding the modified portion of the flow of glass particles is in a ratio of at least about 1:2 or higher with respect to the initial diameter of the growing preform.

8. The method according to claim 3, wherein said major axis of the cross-section of said portion of flame surrounding the modified portion of the flow of glass particles is in a ratio of at least about 1:2.5 or higher with respect to the initial diameter of the growing preform.

9. The method according to claim 3, wherein the ratio between said major axis of the cross-section of said portion of flame surrounding the modified portion of the flow of glass particles and the final diameter of the preform is lower than about 1:7.

10. The method according to claim 3, wherein the ratio between said major axis of the cross-section of said portion of flame surrounding the modified portion of the flow of glass particles and the final diameter of the preform is lower than about 1:6.

* * * * *